US006515052B2

(12) United States Patent
Semen

(10) Patent No.: US 6,515,052 B2
(45) Date of Patent: Feb. 4, 2003

(54) GRANULAR POLYMER ADDITIVES AND THEIR PREPARATION

(75) Inventor: John Semen, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/792,190

(22) Filed: Feb. 23, 2001

(65) Prior Publication Data

US 2002/0117651 A1 Aug. 29, 2002

(51) Int. Cl.$^7$ ................................................. C08K 5/53
(52) U.S. Cl. ............... 524/115; 252/400.2; 252/400.23; 252/400.24; 524/130; 524/133; 524/136
(58) Field of Search ................. 524/115, 130, 524/133, 136; 252/400.2, 400.23, 400.24

(56) References Cited

U.S. PATENT DOCUMENTS

| | | | | |
|---|---|---|---|---|
| 4,111,909 A | * | 9/1978 | Simons | 528/123 |
| 4,443,572 A | | 4/1984 | Burns | 524/120 |
| 4,764,428 A | | 8/1988 | Gloyer | 428/402 |
| 4,929,654 A | | 5/1990 | Wang et al. | 524/117 |
| 4,956,406 A | | 9/1990 | Myers et al. | 524/119 |
| 4,957,956 A | * | 9/1990 | Neri | 524/120 |
| 5,153,029 A | | 10/1992 | Sharma | 427/213.36 |
| 5,190,579 A | | 3/1993 | Gose et al. | 106/18 |
| 5,240,642 A | | 8/1993 | Neri et al. | 252/399 |
| 5,358,560 A | | 10/1994 | Hitch et al. | 106/499 |
| 5,462,984 A | | 10/1995 | Neri et al. | 524/102 |
| 5,597,857 A | | 1/1997 | Thibaut et al. | 524/400 |
| 5,606,007 A | | 2/1997 | Sakashita et al. | 528/176 |
| 5,614,571 A | * | 3/1997 | Mahood | 252/400.24 |
| 5,674,927 A | * | 10/1997 | Mahood | 524/119 |
| 5,773,503 A | | 6/1998 | Steen et al. | 524/445 |
| 5,844,027 A | | 12/1998 | Burdick et al. | 524/110 |
| 5,844,042 A | | 12/1998 | Neri et al. | 523/223 |
| 5,846,656 A | | 12/1998 | Dunski | 428/402 |
| 5,916,539 A | * | 6/1999 | Pilgrimm | 424/9.322 |
| 6,033,600 A | | 3/2000 | Henkins et al. | 252/400.24 |
| 6,056,898 A | | 5/2000 | Semen | 252/400.24 |
| 6,077,890 A | | 6/2000 | Hudson et al. | 524/100 |
| 6,126,862 A | | 10/2000 | Semen | 252/404 |
| 6,126,863 A | | 10/2000 | Semen | 252/404 |
| 6,143,814 A | | 11/2000 | Schiller et al. | 524/303 |

FOREIGN PATENT DOCUMENTS

WO         0017267         3/2000

OTHER PUBLICATIONS

CAPLUS Abstract of JP 06254845, 1994.

* cited by examiner

*Primary Examiner*—Edward J. Cain
(74) *Attorney, Agent, or Firm*—Philip M. Pippenger

(57) ABSTRACT

A compacted particulate polymer additive composition in a dry granular form formed from the following components:

(a) at least one particulate organic phosphite, organic phosphonite, and/or organic phosphonate, and (b) one or more particulate polymer additives other than an organic phosphite, organic phosphonite, or organic phosphonate;

wherein the particles of said composition are held together in compacted dry granular form exclusively or substantially exclusively by contact with dried surfaces of in situ desolvated particles from particles of one or more at least partially solvated components of (a), and optionally by contact with dried surfaces of in situ desolvated particles from particles of one or more at least partially solvated components of (b). Compositions of this type except that there is no component (b) are also described.

47 Claims, No Drawings

GRANULAR POLYMER ADDITIVES AND THEIR PREPARATION

TECHNICAL FIELD

This invention relates to the provision of improved polymer additives—i. e., additives which are for use in polymers—where the additives are in granular form such as pellets.

BACKGROUND

A wide variety of particulate additives are used in thermoplastic polymers in order to improve the properties of the polymer and/or the utility of products formed from such polymers. Included among the types of particulate polymer additives used are, for example, such substances as antioxidants, flame retardants, flame retardant synergists, thermal stabilizers, UV stabilizers, nucleating agents, acid neutralizers, polymer clarifiers, and the like. In order to facilitate blending operations it is desirable to provide additives in a granular form because many additives can cake up or form rat-holes in feed hoppers, and/or feed unevenly through metering equipment. Moreover, certain additives, especially finely-divided additives, often used in the manufacture of polymers, such as high melting nucleating agents and inorganic acid neutralizers can create hazardous airborne dusts during handling and blending operations.

Various methods for converting polymer additives into granular forms have been described heretofore. Such methods include melting at least one component of a dry blend of additives to thereby bond the particles of the blend together, or including in a blend of the additives a special component such as a wax, fatty acid, a compound containing a fatty acid chain or fatty alcohol chain, or metal salt of a fatty acid, and then converting the dry blend into granules or pellets by compacting or milling the blend. All such methods require use of extraneous components to serve as binders, which components are not necessarily desired as components in the finished polymer composition, and which may actually interfere with product specifications of the polymer producer. Moreover, use of some previously used binders can detract from performance properties of the host polymer. And, in some cases the scope of the additives that can be converted into granules or pellets is quite specific and thus not of widespread utility.

Some of these prior developments are described, for example, in U.S. Pat. Nos. 4,957,956; 5,597,857; 5,844,042; 5,846,656; and 6,033,600.

It would be of considerable advantage if a way could be found of converting a blend of two or more particulate polymer additives into granular form such as pellets without depending upon melting a component of the blend or the binding action of a special binder component included in the powder blend such as a wax, a fatty acid, a compound containing a fatty acid chain or fatty alcohol chain, or metal salt of a fatty acid. It would be of even greater advantage if the scope of the blends of particulate additives converted into granules such as pellets could be broadened so that it is unnecessary to rely on only certain specific combinations of additives that produce granules.

This invention is deemed to accomplish these objectives in an efficient and effective manner.

BRIEF SUMMARY OF THE INVENTION

This invention makes it possible to provide granules of particulate polymer additives without use of conventional binder components and without relying on substantial melting of one or more components of the additive blend. In addition the invention is deemed to possess widespread utility in that a very large number of particulate polymer additives can be used in forming the granular additive compositions of this invention. Thus not only is it unnecessary to be restricted to use of specific combinations of additives but in addition, all of the components can be selected from components which are widely-used in thermoplastic polymers. This in turn makes it possible to avoid use of particular components which would be undesired or undesirable in the finished polymer product in which the granular additive composition is employed.

Thus, in one of its embodiments this invention provides a compacted particulate polymer additive composition in dry granular form formed from:

(a) at least one particulate organic phosphite, organic phosphonite, and/or organic phosphonate, and (b) one or more particulate polymer additives other than an organic phosphite, organic phosphonite, or organic phosphonate; wherein the particles in said granules are held interbonded one to another in compacted dry granular form exclusively or substantially exclusively by interbonding with in situ desolvated surfaces of particles of one or more components of (a), and optionally by interbonding with in situ desolvated surfaces of particles of one or more components of (b). In other words, particles in these compositions are held together in compacted dry granular form exclusively or substantially exclusively by desolvated, dried, formerly at least partially-solvated particles of one or more components of (a), and optionally by desolvated, dried, formerly at least partially-solvated particles of one or more components of (b).

In another of its embodiments this invention provides a process of producing such compacted particulate polymer additive composition in dry granular form, which process comprises:

1) forming a paste from (a) at least one particulate organic phosphite, organic phosphonite, or organic phosphonate, (b) one or more particulate polymer additives other than an organic phosphite, organic phosphonite, or organic phosphonate, and (c) an inert organic processing solvent that can be vaporized at a temperature below the lowest melting point or initial melting temperature of (a) and (b);

2) compressing and shaping the paste while preventing or substantially preventing melting of solids used in forming the paste to produce a wet compacted composition in granular form; and 3) drying said wet compacted composition in granular form by vaporizing said processing solvent therefrom to form the dried compacted particulate polymer additive composition in a granular form. Typically a compression apparatus operated so as to prevent or substantially prevent melting of solids is used in conducting step 2) of the process.

An optional further step that may be used is to screen or otherwise classify the dried granular product mixture to separate from the granular product fine particles, if any, that may be present. Such fine particles may be recycled as a feed to the process.

Still another of the embodiments of this invention is a compacted particulate polymer additive composition in dry granular form, formed by a process which comprises:

1) forming a paste from (a) at least one particulate organic phosphite, organic phosphonite, or organic phosphonate, (b) one or more particulate polymer additives other than an organic phosphite, organic phosphonite, or organic phosphonate, and (c) an inert organic processing solvent that can be vaporized at a temperature below the lowest melting point or initial melting temperature of (a) and (b);

2) compressing and shaping the paste while preventing or substantially preventing melting of solids used in forming the paste, to produce a wet compacted composition in granular form; and 3) drying said wet compacted composition in granular form by vaporizing said processing solvent therefrom to form the dried compacted particulate polymer additive composition in a granular form;

said additive composition having compressive hardness and physical integrity resulting from the particles in said granules being held interbonded one to another in compacted dry granular form exclusively or substantially exclusively by interbonding with in situ desolvated surfaces of particles of one or more components of (a), and optionally by interbonding with in situ desolvated surfaces of particles of one or more components of (b). In other words, the resultant composition has compressive hardness and physical integrity resulting exclusively or substantially exclusively from desolvated, dried, formerly at least partially solvated particles of (a), and optionally from desolvated, dried, formerly at least partially solvated particles of (b).

Other embodiments and features of this invention will be still further apparent from the ensuing description and appended claims.

FURTHER DETAILED DESCRIPTION OF THE INVENTION

As used herein, including the claims, the phrase "wherein the particles in said granules are held interbonded one to another in compacted dry granular form exclusively or substantially exclusively by interbonding with in situ desolvated surfaces of particles of one or more components of (a), and optionally by interbonding with in situ desolvated surfaces of particles of one or more components of (b)" means that the granules are held together in compacted dry form entirely or almost entirely by dried particles of one or more components of (a) that now are desolvated but which were at least partially solvated when the granules were dried in situ, and optionally also by dried particles of one or more components of (b) that now are desolvated but which were at least partially solvated when the granules were dried in situ. If component (a) happens to be, say, two different components meeting the definition of (a), dried particles of only one such component of (a) that now are desolvated but which were at least partially solvated when they were dried need hold the granules in compacted dry granular form. The other such component of (a) need not have been solvated to any extent. However, dried particles of the two such components of (a) that now are desolvated but which were at least partially solvated when they were dried can be holding the granules in compacted dry granular form. In any such case it is optional whether particles of one or more components of (b) were or were not solvated to any extent, or if they were at least partially solvated, whether they contribute in any way to holding the granules in compacted dry granular form. However, dried particles of component (b) that now are desolvated but which were at least partially solvated when they were dried may be contributing to holding the granules in compacted dry granular form, since such contribution by particles of (b) to the holding of the granules in compacted dry granular form is optional.

At the outset it will be seen that no component of the additive blends processed pursuant to this invention is caused to be melted during the process. Instead a wet paste formed from particulate solids and an inert organic processing solvent is compressed, preferably in a compression apparatus, and the compression is conducted so as to substantially prevent melting of the solids used in forming the paste.

In addition it will be seen that the particles in the granules are held together not by a conventional binder such as a wax, a paraffin, a fatty acid, a compound containing a fatty acid chain or fatty alcohol chain, or metal salt of a fatty acid. Instead the binding action in the granules results entirely or substantially entirely from the drying of solvated or partially solvated component (a) above, viz., the particulate organic phosphite, organic phosphonite, and/or organic phosphonate compound(s) used, and optionally from the drying of one or more solvated or partially solvated particulate components of (b) used in forming the granules.

As those of ordinary skill in the art will readily appreciate from a reading of this disclosure, not all particles of (a) above need be solvated or partially solvated when forming the granules of this invention. It will suffice if a sufficient number of the particles of (a) above dispersed within the paste are solvated or partially solvated and then compressed and dried in contact with other particles in the granules to hold the granules together and provide granules having sufficient compressive hardness and physical integrity to be used in conventional polymer additive blending apparatus. These same considerations apply to the extent, if any, that particles of (b) are solvated or partially solvated and contribute to the binding action that holds the particles together in the form of granules having such properties—not all such particles of (b) need be solvated or partially solvated nor contribute to the binding action. Those of ordinary skill in the art will also readily appreciate after reading this disclosure that not every single particle in the finished granules of this invention need be bound together. Instead, a suitably small number of free particles may simply be encased or entrapped within a network of bonded particles throughout the granule. Naturally there must be a sufficient number of suitably bonded particles to confer and maintain the compressive hardness and physical integrity enabling the granules to be used in conventional polymer additive blending apparatus.

It will also readily appreciated by those of ordinary skill in the art from a reading of this disclosure and the application of reason and common sense, that if two or more different organic phosphites, organic phosphonites, and organic phosphonates are used as component (a) above it is not necessary that all such components of (a) contribute to the binding action. It will suffice if just one such component provides the necessary binding action and is present in an amount sufficient to result in the formation of dried finished granules of compressive hardness and physical integrity enabling the granules to be used in conventional polymer additive blending apparatus.

Among the advantageous features of this invention is that organic phosphites, organic phosphonites, and organic phosphonates are compounds which are known to be very useful as polymer additives because of their antioxidant properties especially when used in combination with phenolic antioxidants. Also, some of these organic phosphorus compounds are indicated in prior art references to useful as stabilizers in polymers which are subject to thermal, oxidative and ultraviolet light degradation. Thus the organic phosphorus compounds used are desirable additive components which serve at least two functions: (1) providing binding strength on desolvation, compression and/or drying and (2) providing antioxidant and/or stabilization protection to the finished polymer in which the granules are ultimately used.

Without being bound by theory, the available evidence indicates that at least a portion of the particulate phosphorus component in the paste dissolves in the processing solvent to thereby form or act as a glue or adhesive which serves as a result of the compression and/or drying to bind the additive particles together. In other words, it appears that the particles in the dry compacted granules are held together in compacted dry granular form exclusively or substantially exclusively by desolvated adhesive from at least partially solvated particles of the organic phosphorus component(s) used in forming the granular additive composition. In some of the granular compositions of this invention it is possible that in addition to bonding due to desolvated residues of component (a) above, a portion of the bonding is the result of desolvated residues from one or more of the polymer additives of (b) above. To the extent, if any, that such optional bonding from (b) occurs in addition to the bonding from desolvated residues from (a), such co-bonding is within the scope of this invention provided that the physical integrity of the granules is due in such case substantially exclusively to the binding action of dried glue(s) or adhesive(s) formed from desolvated residue(s) from the organic phosphorus compound(s) of (a) and desolvated residue(s) from one or more of the polymer additives of (b) above. Such residues, if they form, may be separate individual residues or they may be mixed residues, or a combination of one or more separate individual residues and of one or more mixed residues. In short, the chemical constitution of co-binding glue(s) or adhesive (s), if any, from desolvation matters not, provided that substantial bonding results from (a), and that any such glue(s) or adhesive(s) bind the particles together one to another upon compression and/or drying to form granules with compressive hardness and physical integrity.

The term "substantially exclusively" as used herein denotes that the physical integrity of the granules is due entirely or at least mainly or principally (i.e., the highest in degree) to the binding action of compressing and/or drying solvated particles formed (i) solely from the organic phosphorus compound(s) of (a) used in forming the granules, or (ii) from both the organic phosphorus compound(s) of (a) and one or more of the components of (b) used in forming the granules. As shown hereinafter, granules of desirable compressive hardness and physical integrity can be formed by the practice of this invention without use of any component known in the art to be a binder irrespective of the mechanism by which it functions. In fact, granules of desirable compressive hardness and physical integrity were made using an organic phosphite as the sole particulate component of the paste formed and used in the processing of this invention. Thus in the practice of this invention bonding due to melting or plastic deformation of a component that in its original state is tacky or pliable, if any such melting or plastic deformation occurs, is incidental and minimal.

The amount of the organic phosphorus component(s) can be relatively small in relation to the other particulate additive components used in forming the granules. Thus although the granular additives produced pursuant to this invention can contain as much as about 95 wt % of one or more particulate organic phosphorus components, the dry compacted granular additive compositions of this invention preferably contain no more than about 50 wt %, more preferably in the range of about 3 to about 40 wt %, still more preferably in the range of about 5 to about 30 wt %, and most preferably in the range of about 15 to about 30 wt % of one or more such organic phosphorus compounds, the balance to 100 wt % being one or more other kinds of particulate additives, such as for example, phenolic antioxidants, amine antioxidants, thermal stabilizers, flame retardants, flame retardant synergists, UV stabilizers, nucleating agents, acid neutralizers, polymer clarifiers, and so on.

In order to prevent any substantial melting from occurring during the preparation of the granular compositions of this invention, it is preferred that each particulate component used in forming the granules have a melting point or initial melting temperature of at least about 50° C., more preferably at least about 100° C., and most preferably at least about 150° C. Consistent with this, the processing solvent used will be an inert organic solvent that can be vaporized, preferably at ordinary atmospheric pressure, at a temperature below the lowest melting point or initial melting temperature of the mixture of the particulate components. Because all operations used in forming the granular or pelleted compositions of this invention are conducted so as to substantially prevent melting of any additive component used in forming such compositions, adhesion due to melting is not utilized for bonding the particles together. Nor is bonding of particles due to plastic deformation of an initially tacky or pliable component involved since no component known to function in such a way need be present in the mixture being processed pursuant to this invention.

The particle size of the particulate components used in forming the paste from which the granular additive compositions of this invention are prepared is not critical as long as the particles are not so large as to be as large or larger than the granules or pellets to be produced. Thus the term "particulate" as used herein refers to particles that can range from fine powders to small grains in size—in short, any particle size which can be converted into the granules of the desired size.

Granules formed pursuant to this invention can be of any size suitable for use in conventional additive blending apparatus or additive feeding equipment used in connection with polymer blending and/or molding or extrusion operations. In addition, the granules can be in any of a variety of suitable shapes such as cylindrical pellets, spherical pellets, tablets, or flakes. And the granules, whatever their shape and size, should be free-flowing, non-sticky and free of appreciable dust-forming characteristics. Preferred granules of this invention have a compressive hardness of at least about 10 pounds per inch as measured by a test procedure described hereinafter.

The organic phosphorus-containing compounds of (a) above used in the practice of this invention include organic phosphites, organic phosphonites, and organic phosphonates which preferably have melting points or initial melting temperatures of at least about 50° C. The initial melting temperature is of course applicable to a component that has a melting range as distinguished from a melting point, the initial melting temperature thus being the lowest temperature at which melting begins in a component that melts over a temperature range. Phosphites, phosphonites, and phosphonates are widely-known to possess antioxidant properties, and many such compounds are available in the marketplace. Among preferred organic phosphorus compounds with melting points or initial melting temperatures of at least about 50° C. are organic phosphites such as are described in U.S. Pat. No. 4,094,855; 4,929,654; or 4,956,406; organic phosphonites such as are described in U.S. Pat. No. 4,233,207 or 4,912,155; and organic phosphonates such as are described in U.S. Pat. No. 3,737,486 or 4,524,167, each such patent being incorporated herein by reference. A few specific non-limiting examples of suitable organic phosphorus compounds that can be used include:

tris(2,4-di-tert-butylphenyl)phosphite;
bis(2,4-di-tert-butylphenyl)pentaerythritol diphosphite;
tetrakis(2,4-di-tert-butylphenyl)-4,4'-biphenylenediphosphonite;
2,4,6-tri-tert-butylphenyl-2-butyl-2-ethyl-1,3-propanediol phosphite;
ethylbis(2,4-di-tert-butyl-6-methylphenyl)phosphite;
3,9-bis(2,4-di-tert-butyl-4-methylphenoxy)-2,4,8,10-tetraoxa-3,9-diphosphaspiro[5.5]undecane;
3,9-tris(2,4,6-tris-tert-butylphenoxy)-2,4,8,10-tetraoxa-3,9-diphosphaspiro[5.5]undecane;
2,2'-ethylidenebis(4,6-di-tert-butylphenyl)fluorophosphonite;
2,2',2"-nitrilo[triethyl-tris(3,3',5,5'-tetra-tert-butyl-1,1'-biphenyl-2,2'-diyl)]phosphite;
bis(2,6-di-tert-butyl-4-carbomethoxyphenyl)phosphorochlorodite;
bis(2,6-di-tert-butyl-4-carbo-2',4'-di-tert-butylphenoxyphenyl)phosphorochlorodite
bis(2,6-di-tert-butyl-4-ethylcarbomethoxyphenyl)phosphorochlorodite;
4,4-dimethyl-2,6-dioxaphosphite of 2,4-di-tert-butylphenyl-3,5-di-tert-butyl-4-hydroxybenzoate;
cyclic ethylene phosphite of 2,4-di-tert-butylphenyl-3,5-di-tert-butyl-4-hydroxybenzoate;
cyclic ethylene phosphite of n-octyl-3,5-di-tert-butyl-4-hydroxybenzoate;
O-acetylbis(2,6-di-tert-butyl-4-carbomethoxyphenyl ester)phosphite;
bis(2,6-di-tert-butyl-4-carbomethoxyphenyl ester) phosphonic acid;
O-(2,6-di-tert-butyl-4-methylphenyl)phenylphosphonochloridite;
O-(2,6-di-tert-butyl-4-methylphenyl)-O'-(2,4-di-tert-butylphenyl)phenylphosphonite;
O-(2,4-di-tert-butylphenyl)-O'-(2,4,6-tri-tert-butylphenyl)phenylphosphonite;
O-(2,6-di-tert-butyl-4-methylphenyl)-O'-(2,6-di-tert-butyl-4-carbomethoxyphenyl)phenylphosphonite;
O-(2,4,6-tri-tert-butylphenyl)phenylphosphonite;
O,O'-bis(2,6-di-tert-butyl-4-carbomethoxyphenyl)phenylphosphonite; and
bis(2,4-dicumylphenyl)pentaerythritol diphosphite.

Mixtures of two or more such compounds can be used, if desired. More preferred phosphorus additives are tris(2,4-di-tert-butylphenyl)phosphite (mp ca. 182–188° C.) and bis(2,4-di-tert-butylphenyl)pentaerythritol diphosphite (mp ca. 160–175° C.), with tris(2,4-di-tert-butylphenyl)phosphite being most preferred.

For ease of reference, the phosphorus compounds used as component (a) herein are sometimes referred to hereinafter, whether used singly or as a combination of two or more such compounds, as "phosphorus component".

Any of a vast number of particulate polymer additive can be used as component(s) of (b) above—i.e., one or more particulate additives other than one or more components of (a) above. The criteria to be used in selecting one or more components of (b) above are that the component be a particulate additive having a melting point or initial melting temperature above the boiling point or final boiling temperature of the processing solvent and above the highest temperature to which the mixture of (a) and (b) will be exposed during the mixing, compressing and drying steps, (preferably a melting point or initial melting temperature of at least about 50° C., more preferably at least about 100° C., and most preferably at least about 150° C.), that it not be a tacky or pliable substance to which other particulate substances will stick or embed to any significant extent during processing, for example by plastic deformation under pressure, and that it be suitable for use as an additive to improve the processability, properties, and/or performance of the finished polymer in which it is employed. Thus in general the particulate additive(s) used as component (b) should be a free-flowing particulate additive that will not melt under the particular conditions selected for use in compressing and drying the paste. Among the categories of polymer additives that can be used are antioxidants, UV or light stabilizers, nucleating agents, acid neutralizers, polymer clarifiers, flame retardants, flame retardant synergists, fillers and reinforcing agents, metal deactivators or passivators, as well as various other functional additives. The art is replete with information about such polymer additives that satisfy these criteria, and thus little would be gained by burdening this disclosure with enormous listings of such additives. A recent patent, U.S. Pat. No. 6,060,543, provides a more-than-adequate listing of typical polymer additives from which components meeting the foregoing criteria can be selected. Thus suitable antioxidants can be found in the disclosure of that patent from Column 34, line 28 through Column 37, line 35. From Column 37, line 36 through Column 40, line 2 of that patent is a listing of UV absorbers and light stabilizers from which components meeting the foregoing criteria can be found. Suitable metal deactivators or passivators can be found in the disclosure of that patent in Column 40, lines 3–12. The patent at Column 42, lines 31 through 38 lists nucleating agents, and at Column 42 from lines 39 through 43 lists fillers and reinforcing agents, from which components of these types meeting the above criteria can be selected. Suitable thiosynergists, peroxide scavengers, polyamide stabilizers, and basic co-stabilizers can be found within the listings at Column 41, lines 49 through 67, and Column 42, lines 29 and 30 of the patent. All of these passages of the patent are incorporated herein by reference with the caveat that each component that is selected from such listings must meet the foregoing criteria.

A few non-limiting examples of types of additives of component (b) that can be used in forming the compositions of this invention include:

A) One or more particulate sterically-hindered phenolic antioxidants, such as 1,3,5trimethyl-2,4,6-tris(3,5-di-tert-butyl-4-hydroxybenzyl)benzene, tris(3,5-di-tert-butyl-4-hydroxybenzyl)isocyanurate, 4,4'-methylenebis(2,6-di-tert-butylphenol), crystalline tetrakis[3-(3,5-di-tert-butyl-4-hydroxyphenyl)propionyloxymethyl]methane, n-octadecyl-3-(3',5'-di-tert-butyl-4-hydroxyphenyl)propionate, 2,2-bis[3',5'-di-tert-butyl-4'-hydroxyphenylpropionyloxyethoxyphenyl]propane, triethyleneglycol-bis[3-(3'-tert-butyl-4'-hydroxy-5-methylphenyl)propionate, and 1,5-bis(3',5'-di-tert-butyl-4'-hydroxyphenylpropionyloxy)-3'-thiopentane.

B) One or more particulate sterically-hindered amine stabilizers such as bis(2,2,6,6tetramethyl-4-piperidinyl)sebacate, bis(2,2,6,6-tetramethyl-4-piperidinyl)succinate, and similar stabilizers meeting the above criteria selected from the stabilizers identified in the passage from Column 4, line 29 through Column 23, line 36 of U.S. Pat. No. 5,597,857, which passage is incorporated herein by reference.

C) One or more particulate nucleating agents such as for example sodium 2,2'-methylenebis(4,6-di-tert-butylphenyl)phosphate, sodium adipate, sodium diphenylacetate, and sodium benzoate. Sodium benzoate is a preferred nucleating agent.

D) One or more particulate polymer clarifiers such as for example 1,3:2,4-bis(3,4-dimethylbenzylidene)sorbitol (Millad 3988; Millikan Chemical), 1,3:2,4-bis-(p-methylbenzylidene)sorbitol (Millad 3940; Millikan Chemical), and 1,3:2,4-di-O-benzylidenesorbitol (Millad 3905; Millikan Chemical).

E) One or more particulate acid neutralizers such as for example metal oxides (e.g., zinc oxide, magnesium oxide, and titanium dioxide), metal carbonates (e.g., calcium carbonate, and magnesium carbonate) and natural or synthetic hydrocalcites (e.g., magnesium hydrotalcites such as DHT-4A, DHT-4V, DHT-4C (all available from Kyowa Chemical Co.); Hysafe 539 and Hysafe 530 (available from J.M. Huber Corporation); L-55R acid neutralizers (available from Reheis Inc.); and zinc hydrotalcites such as ZH4-A (available from Kyowa Chemical Co.). Preferred acid neutralizers are DHT-4A, DHT-4V and DHT-4C.

F) One or more particulate flame retardants, such as decabromodiphenyl oxide, tetrabromobisphenol-A, hexabromocyclododecane, SAYTEX® 8010® flame retardant, a brominated aromatic compound of proprietary structure (Albemarle Corporation), tetradecabromodiphenoxybenzene, tetrabromocyclooctane, ethylenebistetrabromophthalimide, bis(2,3-dibromopropyl ether) of tetrabromobisphenol-A, bis(2,3-dibromopropyl ether) of tetrabromobisphenol-S, hexabromobenzene, melamine, ammonium polyphosphate, and particulate organic phosphorus flame retardants, such as high-melting nitrogen-containing diphosphinic compounds such as described in U.S. Pat. No. 5,281,637, the disclosure of which pertaining to such compounds and their preparation is incorporated herein by reference.

G) One or more particulate flame retardant synergists, such as antimony trioxide, sodium antimonate, and sodium borate.

H) One or more particulate heat stabilizers, such as dibutyltin mercaptopropionate (Bärostab M 36; Bärlocher GmbH), dioctyltin mercaptopropionate (Bärostab OM 36; Bärlocher GmbH), and polymeric dibutyltin maleate (Bärostab MS; Bärlocher GmbH).

I) One or more particulate fillers or reinforcing agents, such as silica, alumina, silica-alumina, natural or synthetic zeolite, montmorillonite, short glass fibers, and metal whiskers.

A binding quantity of the phosphorus component is used in forming the granulated products of this invention, i.e., an amount which upon completion of the drying step is enough to provide granules having sufficient compressive hardness and physical integrity to withstand conventional handling, transporting, and mixing operations used in forming dry polymer blends for use in molding or extrusion of molten polymer blends. It is preferable to provide a content of the phosphorus component of at least about 3 wt % in the dried granulated product. More preferable is a content of the phosphorus component of at least about 5 wt %, and still more preferable is a content of at least about 10 wt %. Most preferably the content of the phosphorus component of is at least about 15 wt %.

The processing solvent used is preferably one in which the phosphorus component used has a minimum solubility of about 5 grams per liter of solvent. More preferably, at the temperature of paste formation, the minimum solubility of the phosphorus component in the solvent is about 10 grams per liter of solvent, and most preferably is about 20 grams per liter of solvent. Preferably, however, the solvent used is one in which the solubility of the phosphorus component is limited. Thus, it is desirable to use a solvent in which the phosphorus component has a maximum solubility of about 300 grams of phosphorus component per liter of solvent, with a maximum solubility of about 200 grams per liter being more desirable, and a maximum solubility of about 100 grams per liter being most desirable. Such solubilities are preferably measured at a temperature in the range of from about 200° C. to about 70° C., but most preferably are measured at the temperature at which the paste is formed into granules.

It should be noted that even when using phosphorus component/processing solvent pairs in which the solubilities which are greater than the maximum values given above, it is possible, in principle, to form granules or pellets according to the process of this invention. Adjustment of the solvent level can be performed, in most cases, to yield a suitable paste.

To form the paste, it is preferable to dry blend each of the particulate components of (a) and (b) together in a dry blender to form a substantially uniform mixture, and then to add the processing solvent and mix the resultant wet mixture to form a substantially uniform paste. However, other modes of addition can be used. For example, when forming a mixture which is to be granulated, such as a mixture of a suitable phosphite, a high melting acid neutralizer and a high melting nucleating agent, and the processing solvent, it is not necessary to combine the dry components before adding the processing solvent. Instead, the acid neutralizer can be mixed with the nucleating agent to form a mixture to which the solvent, and phosphite are added, concurrently or in any order. If desired, one of the dry components can be combined with the processing solvent, followed by the addition of the other two dry components. Still another approach is to continuously combine the ingredients in small amounts immediately prior to granulation. In short, there is nothing critical about the order or mode of addition; any method which results in the formation of a substantially uniform paste can be used.

Regardless of order or mode of addition, it is preferable to evenly disperse the phosphorus component with the other particulate component(s) so that the phosphorus component is substantially uniformly dispersed within the paste before the granulation process.

If the paste which is to be formed will comprise antioxidant or nucleating agent components, it is highly preferable that the phosphorus component be soluble in the processing solvent at the paste formation temperature. If any other particulate components are soluble in the processing solvent at paste formation temperature, such solubility will not necessarily decrease the compressive hardness of the resulting granules.

Furthermore, if the phosphorus component used is a mixture or combination of two or more phosphorus compounds, low dust compositions of the present invention can be prepared if even only one such phosphorus compound has a solubility in the above ranges.

Use can be made of any of a wide variety of inert organic processing solvents that can be vaporized at a temperature below the lowest melting point or melting range of the particulate components being used. For example, if the lowest component melts, say, at 55° C., the processing solvent used should be capable of being totally vaporized at a temperature below 55° C., preferably at ambient atmospheric pressure. If necessary or desirable, however, the drying can be performed at reduced pressure as long as the vacuum applied does not result in appreciable decompaction of the shaped granules.

Non-limiting examples of types of processing solvents which can be used include hydrocarbons, e.g., alkanes, cycloalkanes, alkenes, cycloalkenes, and aromatic hydrocarbons; halogenated hydrocarbons; ethers; alcohols; and ketones. A few illustrative examples of such solvents include pentane, hexane, isopentane, heptane, isohexane, 2-methylheptane, cyclopentane, cyclohexane, methylcyclopentane, methylcyclohexane, benzene, toluene, chloroform, methylene chloride, diethyl ether, 2-ethoxypropane, tetrahydrofuran, 1,4-dioxane, ethyl alcohol, isopropyl alcohol, acetone, methylethyl ketone, and mixtures thereof. Preferred are hexane, isohexane, and cyclohexane.

In cases where all of the particulate components have melting points or initial melting temperatures significantly above 150° C., e.g., 180° C. or above, it is nevertheless preferable to use a processing solvent that is an inert organic solvent that can be completely vaporized at a temperature below about 150° C. and atmospheric pressure. While it is possible in such cases to use inert processing solvents which have boiling points or final boiling temperatures above 150° C. at atmospheric pressure, such higher boiling solvents may require use of more expensive drying methods and equipment, such as vacuum drying, depending upon the melting points or lowest melting temperature of the particulates being processed. Moreover, unless carried out under suitably controlled conditions, some decompaction of the wet compressed granules may occur during vacuum drying.

During the granulation process, the phosphorus component, the other particulate polymer additive(s), and the processing solvent are converted into a substantially uniform paste. It is preferable that the paste be of a consistency that it can be extruded without need for excessively high operating pressures, or temperatures that would result in melting and/or fusion. The granulation process should thus be conducted such that if the wet paste is worked and extruded through a die press, the internal temperatures of the apparatus and of the paste are kept below temperatures at which melting and fusion of the particles may occur. Suitable ways of conducting operations in this manner are of course well-known to those of ordinary skill in the art.

Any proportions of the selected particulate additive components of (a) and (b), and processing solvent that form a compressible or compactible and shapeable paste without melting any component can be used. Without in any way limiting the range of proportions for use in forming suitable pastes, in general, it is preferable to have a solvent:total additive weight ratio in the range of from about 3 to about 20 parts by weight of solvent per 100 parts by weight of total additive. By total additive is meant all of the particulate additives being used in forming the paste and resultant granules or pellets.

One or more granulation methods may be used to form the paste (solvent-wet additive powder mixture) into granules. One of the most convenient methods is to extrude the paste through a die plate with suitable-sized holes to produce one or more strands or "noodles" which are sliced into pellets of desired length. Such pellets are typically cylindrical with a cross section size and shape determined by the characteristics of the holes in the die plate. The cross sectional shape of the pellet generally does not greatly affect its compressive hardness, and thus does not greatly affect the dusting properties of the granular mixture. A wide range of cross sectional shapes can be used. Suitable cross sectional shapes include circular, oval, triangular, rectangular, pentagonal, hexagonal, other polygonal, and semicircular and other shapes with one or more curved sides. It is preferable that the cross sectional area be in the range of from about 1 to about 75 square millimeters. More preferable is a cross sectional area in the range of from about 3 to about 20 square millimeters. A cross sectional area in the range of from about 3 to about 9 square millimeters is most preferable. A pellet length distribution in the range of from about 0.5 to about 10 times the effective pellet diameter is desirable, with a pellet average length in the range of from about 1 to about 5 times the pellet diameter being desirable, and a pellet average length in the range of from about 2 to about 3 times being most desirable. By "effective pellet diameter" is meant the maximum cross-sectional dimension of the pellet. For example, in the case of cylindrical pellet, the effective pellet diameter is the diameter of its circular cross section, whereas in the case of a square pellet the effective pellet diameter is the diagonal distance of its square cross-section from one corner to the opposite corner.

The formation of cylindrical pellets is convenient and thus preferred. However, other methods of granulation can be used instead of or in addition to die-plate formed cylindrical pellets. For example, a Marumerizer (LCI Corporation) can be used to convert cylindrical pellets into pellets which are roughly spherical. The preferred, more preferred and most preferred cross sectional areas of pellets produced this way are as for extruded pellets as described above.

The granules produced by the process of this invention typically have the benefit of having extremely low dust-forming characteristics. However, since the granulation process itself may in some cases produce some broken granules or other dust-producing fines, it is desirable in such cases to remove particles smaller than about 0.25 millimeter in size. This can be readily accomplished by sieving the dry granules with a screen having 0.25-millimeter openings, such as a U.S. Standard No. 60 screen. Other suitable methods of classifying the granules to remove these small particles can be used, if desired. Where low dusting is of importance to the user of the granules, it is desirable that the granules contain at most about 3 wt % of particles smaller than 0.25 millimeter. Preferred low-dust granules of this invention contain no more than about 0.5 wt %, and more preferably no more than about 0.1 wt %, of particles smaller than 0.25 millimeter.

The compression or compaction and shaping of the paste into granules or pellets is preferably conducted in a pellet mill, a device which typically kneads the contents with rollers and forces the contents through orifices of a die. The pellet mill will typically be operated at a die temperature in the range of from about ambient room temperature (e.g., about 20° C.) up to about 5° C. below the boiling temperature of the processing solvent being used, which in turn is below the lowest melting temperature of any of the particulates in the paste. For example if the processing solvent used is cyclohexane (bp=81° C.), the die temperature should typically be in the range of about 20 to about 76° C. To ensure that at least some of the processing solvent remains in the pellets as they are being shaped or formed, the pellet mill is preferably operated at a die temperature that is at least about 10° C. below, and more preferably at least about 20°

C. below, the normal boiling temperature of the processing solvent. As there typically are no external or internal heaters or electrical or electronic temperature controllers in a pellet mill, the balance between the frictional heating rate from the flow of paste through the die orifices and the natural heat losses from the pellet mill sets up the actual die temperature for a given paste composition. In practice, the desired die temperature is achieved by appropriately setting two principal operating variables for a given composition: 1) The concentration of processing solvent (die temperature decreases with increasing solvent concentration), and 2) the aspect ratio (i.e., working length—also called "pressway" length—divided by the diameter of the die holes). Die temperature typically increases with increasing aspect ratio. Other operating parameters of the pellet mill (e.g., rotor speed, paste feed rate, etc.) can also affect die temperature, but these normally have a relatively small effect on the die temperature compared with the solvent concentration in the paste and the aspect ratio of the die holes.

Other types of equipment which may be used for compressing or compacting and shaping the paste into granules or pellets include paste extruders and powder extruders. These devices typically operate in similar fashion to pellet mills except that they utilize rotary screw action to force the contents through the die holes rather than using rollers for this purpose.

In the practice of this invention the temperatures of the paste being compressed or compacted and shaped must not be above the melting temperature of the granules or pellets or of any of the solid additive component(s) therein.

It will be understood and appreciated that the compression or compaction and shaping can be conducted in either order. Thus, it is possible to shape the wet paste into large granular form and then subject these large granules to compression to form the compacted granules. However, typically the wet paste will be compressed such as by extrusion through a die orifice and then shaped into granules by cutting the extrudate.

In the solvent-wet mixture prior to granulation, it is preferable that the weight percent of processing solvent in the wet paste mixture be in the range of from about 1 to about 20 wt % and preferably in the range of from about 2 to about 10 wt %. Most preferably the wet paste mixture prior to granulation contains in the range of about 5 to about 10 wt % of processing solvent.

The granules can vary in the relative proportions of component(s) (a) to component(s) (b). For example, these components can be used in an (a):(b) weight ratio as high as about 99.9:0.1, but usually such ratio will be up to about 50:50, and typically in the range of about 3:97 to about 40:60. Preferably such (a):(b) weight ratio is in the range of about 5:95 to about 30:70, and most preferably in the range of about 15:85 to about 30:70. In one embodiment of this invention all of the solids in the granules are particles of (a), i.e., (i) one or more organic phosphites, (ii) one or more organic phosphonites, or (iii) one or more organic phosphonates, or (iv) any mixture of any two or all three of (i), (ii), and (iii), wherein the particles in said composition are held together in compacted dry granular form exclusively or substantially exclusively by dried desolvated at least partially solvated particles of (a) bonded together, apparently by desolvated residue.

Prior to use or storage, the granules or pellets must be dried of all or nearly all of the processing solvent. Amounts of residual solvent, if any, will typically be trace amounts, e.g., up to about 100 ppm wt/wt of residual processing solvent. The drying process can take place at room temperature or at an elevated temperature, with temperatures in the range of from about 60° C. to about 105° C. being most convenient, provided of course that the drying temperature is not above the melting temperature of the granules or of any of the additive component(s) therein. Many types of dryers are suitable, such as a forced air oven, vacuum oven, fluid bed dryer, Wyssmont dryer or belt dryer. It will be understood, of course, that the wet compressed granules need not be under a compressive force that is being applied at the time the granules are being dried. It will also be understood that the dried granules consist essentially of components (a) and (b) modified only to the extent, if any, that salvation, desolvation, and compression may affect their original physical condition and/or chemical composition. Generally speaking, no components other than components (a) and (b) and the processing solvent are present in the pastes used in forming the dried granular compositions of this invention. If it is desirable to include a liquid as a polymer additive in the compositions of this invention, it should form a single phase liquid with the processing solvent and not adversely affect the processing of the paste or the properties of the dried granules. In addition, any such liquid used as a polymer additive should be devoid or substantially devoid of any binding properties and must be capable of being dried under the drying conditions used in forming the dried compacted granules. Ordinarily no more than about 20 wt % of the finished dried granules should be based on dried residue from such dried, non-binding, initially liquid polymer additive.

A suitable index of the tendency of a granular material to produce dust is the compressive hardness of the particles. The term "compressive hardness" as used herein is defined as a measure of the friability resistance of the granule as determined by:

1) placing the granule between two parallel, unpadded steel plates such that the long dimension of the pellet is parallel to the steel plates;
2) applying an increasing load to the top plate while holding the bottom plate stationary until the pellet begins to disintegrate; and
3) dividing the load obtained in step 2) by the length of the granular test specimen. Compressive hardness is generally expressed in units of lbs/in. Generally, a granule with a high compressive hardness has only a low tendency towards dust production, whereas a low compressive hardness indicates strong tendency to produce dust. Good friability resistance characteristics are obtained with a compressive hardness greater than about 5 lbs/in, with greater than 10 lbs/in being more preferred, and greater than 15 lbs/in being most preferred. In conducting this procedure one should randomly select at least 13 particles from a given batch of dried granules, subject each such particle individually to the procedure, and calculate the average compressive hardness value from the results on each of the 13 or more individual particles tested.

When forming or shaping the granules such as pellets according to the process of this invention, it is preferable in most cases that the phosphorus component be partially but not completely dissolved in the processing solvent. However in some cases, for example where the proportion of the phosphorus compound in the blend of (a) plus (b) is relatively small (e.g., in amounts in the vicinity of about 3 to about 5 wt %), it can be advantageous for all of the phosphorus component to be in solution. Examination of dried granules of this invention by scanning electron microscopy (SEM) typically shows that the particles are closely packed together—dried glue or adhesive, if any, formed in the process is usually not readily perceivable by SEM. In situations where essentially complete solvation followed by desolvation of the phosphorus component has occurred, the particles of the desolvated phosphorus component in the dried granules may be irregularly-shaped and of different sizes from their original size before use in the process. It is to be clearly understood and appreciated that these characteristics relating to SEM observations are not to be construed as limitations or requirements of the invention. As long as partial solvation of at least the phosphorus component occurs in the process and the solvated portion of at least the phosphorus component is dried while the particles in the granules are in intimate compacted contact one to another, the resultant dried granules of this invention exhibit the compressive hardness and physical integrity to be used in conventional dry blending operations.

The following Examples illustrate this invention, but do not limit its scope.

EXAMPLE I

Ten pounds of tris(2,4-di-tert-butylphenyl)phosphite (IRGAFOS 168 powder; Ciba Specialty Chemicals Corporation) and 1.30 lbs of cyclohexane were combined and tumble blended for six minutes to obtain a homogeneous mixture. The mixture was processed into cylindrical pellets by: 1) Feeding the mixture at about 58–68 lbs/hr rate to a KAHL Model 14-175 Pellet Mill that was equipped with a die plate having holes of 3 mm diameter and 10.5 mm pressway length and operated at about 100 rpm rotor speed; 2) collecting the output of the pellet mill in stainless steel pans; 3) drying the output material for 2 hours in a forced-air oven operating at 105° C. and under a nitrogen atmosphere; and 4) dry sieving the dry material with a US Standard No. 8 screen to remove the processing fines (i.e., particles small enough to pass through the No. 8 screen). The resulting product, which was obtained in about 83% yield, consisted of cylindrical pellets of nominally 3 mm diameter and with particle compressive hardness of 13–14 lbs/in (compressive hardness test method). The granules exhibited low dusting and good powder flow properties, and thus good metering and handling characteristics.

EXAMPLE II

Sodium benzoate powder (9.6 lbs of 44 micron low-dusting grade obtained from Total Specialty Chemicals), 4.80 lbs of DHT-4A hydrotalcite powder (obtained from Kyowa Chemical Industry Co., Ltd.), and 1.60 lbs of IRGAFOS 168 phosphite powder (obtained from Ciba Specialty Chemicals) were combined and tumble blended for 6 minutes. Processing solvent (2.40 lbs of cyclohexane) was added to the powder blend, and this mixture was tumble blended for six minutes to obtain a homogeneous mixture for pelleting. The pelleting operation was performed with a Kahl Model 14-175 Pellet Mill equipped with a die plate having holes of three mm diameter and 10.5 mm pressway length, and operating at about 100 rpm rotor speed. The feed mixture was metered to the pellet mill with a twin screw volumetric feeder at about 26 lbs/hr rate. The output from the pellet mill was collected in stainless steel pans, which were then put in a forced air oven, operating at 105° C., and under nitrogen atmosphere, for 1.5 hrs in order to evaporate off the processing solvent. The dried product was dry sieved with a US Standard No. 8 screen to remove the fines (i.e., the particles small enough to pass through the No. 8 screen). The resulting product was obtained in 93–95% yield. It was in the form of white cylindrical pellets of nominally three mm diameter, and with lengths ranging from about one mm to about six mm. The product had a high compressive hardness, viz., 22–33 lbs/in, and exhibited low dusting and excellent powder flow.

Examples I and II demonstrate that the desolvated, dried, formerly at least partially solvated organic phosphite serves as a highly effective binding component to hold the particles together, thus eliminating the need for conventional binders or melted components in forming granules such as pellets having desirable physical integrity.

Accordingly, it can be seen that in the practice of this invention, polymer additive compositions are produced and provided in granular form without use of any melted component such as a low melting binder or and component that in its non-wet state is sticky or pliable (putty-like). Likewise polymer additive compositions are produced and provided in granular form without requiring use of fatty acids or fatty alcohols or their derivatives such as metal stearate salts (e.g., calcium stearate, magnesium stearate, zinc stearate, etc.). However it is possible, though not preferred, to include such salts in the compositions of this invention to partake of their acid neutralizing capability, provided that they do not interfere with the bonding brought about by the desolvated, dried, formerly at least partially solvated organic phosphorus component(s) of (a) used in the practice of this invention, and provided further that their presence does not adversely affect the particular polymer in which the granules are to be employed.

It can further be seen that the compacted particulate polymer additive compositions of this invention are composed of integral granules formed from packed-together particles which, while at least partially solvated, were dried while in intimate contact one to another.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

It will also be understood that the terms "substantial" and "substantially" denote that chemical processes or operations ordinarily do not involve absolutes. According to a standard dictionary definition which is relied upon herein, "substantial" means being of considerable importance, value, degree, amount, or extent. Such a definition is certainly clear enough to be readily understood by anyone having ordinary skill in the scientific arts. Thus instead of describing a variable as an absolute, it is far more realistic to describe the variable as being in the substantial vicinity of the expressed variable. For example when describing whether melting occurs it is possible that an inconsequential number of molecules of a substance may melt without such melting having any detectable or significant effect upon the result being achieved. Thus it is far more realistic to indicate that melting is prevented or substantially prevented so as to avoid hypertechnical legalistic manipulation of words. Thus in any and all respects, this document should be read with the application of reason and common sense.

It is to be understood that the reactants and components referred to by chemical name or by formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, chemical transformations and/or chemical reactions, if any, take place in the resulting mixture or solution as such changes, transformations and/or reactions are the natural result of bringing the specified components together under the conditions called for pursuant to this disclosure. In short, the components are identified as ingredients to be brought together in connection forming a mixture to be used in conducting specified operations. In addition, even though the claims hereinafter may refer to substances, components and/or ingredients in the present tense "comprises", "is", etc.), the reference is to the substance, component or ingredient as it existed at the time just before it was first contacted, blended or mixed with one or more other substances, components and/or ingredients in accordance with the present disclosure.

Each and every document cited herein is incorporated into this disclosure as if set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A compacted particulate polymer additive composition in a dry granular form formed from the following components:
    (a) at least one particulate organic phosphite, organic phosphonite, and/or organic phosphonate, and
    (b) one or more particulate polymer additives other than an organic phosphite, organic phosphonite, or organic phosphonate;
    wherein the particles in said granules are held interbonded one to another in compacted dry granular form exclusively or substantially exclusively by interbonding with in situ desolvated surfaces of particles of one or more components of (a), and optionally by interbonding with in situ desolvated surfaces of particles of one or more components of (b).

2. A composition of claim 1 wherein the components of (a) and (b) have melting points or initial melting temperatures of at least about 100° C.

3. A composition of claim 1 wherein the components of (a) and (b) have melting points or initial melting temperatures of at least about 150° C.

4. A composition of claim 1 wherein component (a) used is at least one organic phosphite.

5. A composition of claim 4 wherein said organic phosphite is tris(2,4-di-tert-butylphenyl)phosphite.

6. A composition of claim 1 wherein each polymer additive of (b) used has a melting point or initial melting temperature of at least about 50° C. and wherein at least one said polymer additive of (b) is a hindered phenolic antioxidant, a nucleating agent, a polymer clarifying agent, an acid neutralizer or a UV or light stabilizer.

7. A composition of claim 6 wherein component (a) used is at least one organic phosphite.

8. A composition of claim 1 wherein component (b) used is selected from the group consisting of (i) one or more nucleating agents, (ii) one or more polymer clarifying agents, (iii) one or more acid neutralizers, and (iv) mixtures of any two or all three of (i), (ii), and (iii), and wherein each said component (b) used has a melting point or initial melting temperature of at least about 200° C.

9. A composition of claim 6 wherein component (a) used is at least one organic phosphite.

10. A composition of claim 1 wherein component (b) used is selected from the group consisting of (i) sodium benzoate, (ii) 1,3:2,4-bis(3,4-dimethylbenzylidene)sorbitol, (iii) 1,3:2,4-bis-(p-methylbenzylidene)sorbitol, (iv) 1,3:2,4-di-O-benzylidenesorbitol, (v) at least one metal oxide acid neutralizer, (vi) at least one metal carbonate acid neutralizer, (vii) at least one natural or synthetic hydrotalcite, and (viii) mixtures of any two or more of (i) through (vii) inclusive.

11. A composition of claim 10 wherein component (a) used is at least one organic phosphite or at least one organic phosphonite, or both of them.

12. A composition of claim 10 wherein component (a) used is tri(2,4-di-tert-butylphenyl)phosphite.

13. A process of producing a compacted particulate polymer additive composition in a dry granular form, which process comprises:
    1) forming a paste from (a) at least one particulate organic phosphite, organic phosphonite, or organic phosphonate, (b) one or more particulate polymer additives other than an organic phosphite, organic phosphonite, or organic phosphonate, and (c) an inert organic processing solvent that can be vaporized at a temperature below the lowest melting point or initial melting temperature of (a) and (b);
    2) compressing and shaping the paste while preventing or substantially preventing melting of solids used in forming the paste, to produce a wet compacted composition in granular form; and
    3) drying said wet compacted composition in granular form by vaporizing said processing solvent therefrom to form the dried compacted particulate polymer additive composition in a granular form.

14. A process of claim 13 wherein (a) and (b) have melting points or initial melting temperatures of at least about 100° C.

15. A process of claim 13 wherein (a) and (b) have melting points or initial melting temperatures of at least about 150° C.

16. A process of claim 13 wherein (a) used is one or more organic phosphites.

17. A process of claim 16 wherein said one or more organic phosphites is tris(2,4-di-tert-butylphenyl)phosphite.

18. A process of claim 13 wherein (b) used is selected from the group consisting of (i) at least one hindered phenolic antioxidant, (ii) at least one nucleating agent, (iii) at least one polymer clarifying agent, (iv) at least one acid neutralizer, (v) at least one UV or light stabilizer, and (vi) a mixture of any two or more of (i) through (v) inclusive.

19. A process of claim 18 wherein (a) used is one or more organic phosphites.

20. A process of claim 13 wherein each (b) used has a melting point or initial melting temperature of at least about 100° C., and wherein (b) is selected from the group consisting of (i) at least one nucleating agent, (ii) at least one polymer clarifying agent, (iii) at least one acid neutralizer, and a mixture of any two or all three of (i), (ii), and (iii).

21. A process of claim 20 wherein (a) used is one or more organic phosphites.

22. A process of claim 13 wherein (b) is selected from the group consisting of (i) sodium benzoate, (ii) 1,3:2,4-bis(3,4-dimethylbenzylidene)sorbitol, (iii) 1,3:2,4-bis-(p-methylbenzylidene)sorbitol, (iv) 1,3:2,4-di-O-benzylidenesorbitol, (v) at least one metal oxide acid neutralizer, (vi) at least one metal carbonate acid neutralizer, (vii) at least one natural or synthetic hydrotalcite, and (viii) a mixture of any two or more of (i) through (v) inclusive.

23. A process of claim 22 wherein (a) used is at least one organic phosphite or at least one organic phosphonite, or both of them.

24. A process of claim 22 wherein (a) used is tri(2,4-di-tert-butylphenyl)phosphite.

25. A process of claim 13 further comprising separating fine particles from the dried compacted particulate polymer additive composition in a granular form.

26. A compacted particulate polymer additive composition in a dry granular form, formed by a process which comprises:
1) forming a paste from (a) at least one particulate organic phosphite, organic phosphonite, or organic phosphonate, (b) one or more particulate polymer additives other than an organic phosphite, organic phosphonite, or organic phosphonate, and (c) an inert organic processing solvent that can be vaporized at a temperature below the lowest melting point or initial melting temperature of (a) and (b);
2) compressing and shaping the paste while preventing or substantially preventing melting of solids used in forming the paste, to produce a wet compacted composition in granular form; and
3) drying said wet compacted composition in granular form by vaporizing said processing solvent therefrom to form said additive composition in a dry granular form; said additive composition in a dry granular form having compressive hardness and physical integrity resulting exclusively or substantially exclusively from dried desolvated at least partially solvated particles of (a), and optionally from dried at least partially solvated particles of (b).

27. A composition of claim 26 wherein (a) and (b) have melting points or initial melting temperatures of at least about 150° C.

28. A composition of claim 26 wherein (a) and (b) have melting points or initial melting temperatures of at least about 150° C.

29. A composition of claim 26 wherein (a) used is at least one organic phosphite.

30. A composition of claim 29 wherein said at least one organic phosphite is tris(2,4-di-tert-butylphenyl)phosphite.

31. A composition of claim 26 wherein (b) used is selected from the group consisting of (i) at least one hindered phenolic antioxidant, (ii) at least one nucleating agent, (iii) at least one polymer clarifying agent, (iv) at least one acid neutralizer, (v) at least one UV or light stabilizer, and (vi) a mixture of any two or more of (i) through (v) inclusive.

32. A composition of claim 31 wherein (a) used is at least one organic phosphite.

33. A composition of claim 26 wherein (b) used has a melting point or initial melting temperature of at least about 200° C. and is selected from the group consisting of (i) at least one nucleating agent, (ii) at least one polymer clarifying agent, (iii) at least one acid neutralizer, and a mixture of any two or all three of (i), (ii), and (iii).

34. A composition of claim 31 Wherein (a) used is at least one organic phosphite.

35. A composition of claim 26 wherein (b) used is selected from the group consisting of (i) sodium benzoate, (ii) 1,3:2,4-bis(3,4-dimethylbenzylidene)sorbitol, (iii) 1,3:2,4-bis-(p-methylbenzylidene)sorbitol, (iv) 1,3:2,4-di-O-benzylidenesorbitol, (v) at least one metal oxide acid neutralizer, (vi) at least one metal carbonate acid neutralizer, (vii) at least one natural or synthetic hydrotalcite, and (viii) a mixture of any two or more of (i) through (vii) inclusive.

36. A composition of claim 35 wherein (a) used is at least one organic phosphite or at least one organic phosphonite, or both of them.

37. A composition of claim 35 wherein (a) used is tri(2,4-di-tert-butylphenyl)phosphite.

38. A composition of claim 26 having a compressive hardness of at least about 10 pounds per inch.

39. A compacted particulate polymer additive composition in a dry granular form formed exclusively from at least one component selected from the group consisting of (i) at least one particulate organic phosphite, (ii) at least one organic phosphonite, (iii) at least one organic phosphonate, and (iv) a mixture of any two or all three of (i), (ii), and (iii), wherein the particles of said composition are held interbonded one to another in compacted dry granular form exclusively or substantially exclusively by interbonding with in situ desolvated surfaces of particles of at least partially solvated particles of the organic phosphite, organic phosphonite, and/or organic phosphonate used in forming said composition.

40. A composition of claim 39 wherein said at least one component used is at least one organic phosphite or at least one organic phosphonite, or both of them.

41. A composition of claim 39 wherein said at least one component used is tri(2,4-di-tert-butylphenyl)phosphite.

42. A process of producing a compacted particulate polymer additive composition in a dry granular form, which process comprises:
1) forming a paste from (A) one or more components selected from the group consisting of (i) particulate organic phosphite, (ii) particulate organic phosphonite, (iii) particulate organic phosphonate, and (iv) a mixture of any two or all three of (i), (ii), and (iii), and (B) an inert organic processing solvent that can be vaporized at a temperature below the lowest melting point or initial melting temperature of said one or more components of (A);
2) compressing and shaping the paste while preventing or substantially preventing melting of solids used in forming the paste, to produce a wet compacted composition in granular form; and
3) drying said wet compacted composition in granular form by vaporizing said processing solvent therefrom to form the dried compacted particulate polymer additive composition in a granular form.

43. A process of claim 42 wherein said one or more components of (A) used is at least one organic phosphite or at least one organic phosphonite, or both of them.

44. A process of claim 42 wherein said one or more components of (A) used is tri(2,4-di-tert-butylphenyl) phosphite.

45. A composition in a dry granular form formed by the process of claim 42, said composition having compressive hardness and physical integrity resulting exclusively or substantially exclusively from dried desolvated at least partially solvated particles of (A).

46. A composition in a dry granular form formed by the process of claim 43, said composition having compressive hardness and physical integrity resulting exclusively or substantially exclusively from dried desolvated at least partially solvated particles of (A).

47. A composition in a dry granular form formed by the process of claim 44, said composition having compressive hardness and physical integrity resulting exclusively or substantially exclusively from dried desolvated at least partially solvated particles of (A).

* * * * *